(12) United States Patent
Mosman

(10) Patent No.: US 8,936,100 B2
(45) Date of Patent: Jan. 20, 2015

(54) DRIVE SLEEVE AND SEALING MECHANISM FOR NON-RISING STEM GATE VALVE

(75) Inventor: Bradley Wayne Mosman, Shawnee, OK (US)

(73) Assignee: Cameron International Corporation, Houston, TX (US)

( * ) Notice: Subject to any disclaimer, the term of this patent is extended or adjusted under 35 U.S.C. 154(b) by 625 days.

(21) Appl. No.: 13/133,831

(22) PCT Filed: Jan. 12, 2010

(86) PCT No.: PCT/US2010/020823

§ 371 (c)(1),
(2), (4) Date: Jun. 9, 2011

(87) PCT Pub. No.: WO2010/090797

PCT Pub. Date: Aug. 12, 2010

(65) Prior Publication Data

US 2011/0277985 A1 Nov. 17, 2011

Related U.S. Application Data

(60) Provisional application No. 61/149,978, filed on Feb. 4, 2009.

(51) Int. Cl.
| | | |
|---|---|---|
| E21B 34/02 | (2006.01) | |
| F16K 3/00 | (2006.01) | |
| F16K 31/50 | (2006.01) | |
| F16K 3/02 | (2006.01) | |

(52) U.S. Cl.
CPC ............ F16K 31/508 (2013.01); F16K 3/0254 (2013.01)

USPC .......... 166/386; 166/368; 166/86.3; 251/326; 251/355

(58) Field of Classification Search
USPC ............ 166/368, 373, 386, 86.3, 80.1, 332.2; 251/326–329, 355
See application file for complete search history.

(56) References Cited

U.S. PATENT DOCUMENTS

| | | | | |
|---|---|---|---|---|
| 1,828,478 A | * | 10/1931 | Sparks | ............................ 251/329 |
| 3,036,807 A | * | 5/1962 | Lucky et al. | ...................... 251/28 |
| 3,071,343 A | * | 1/1963 | Milleville | ...................... 251/175 |
| 3,763,880 A | | 10/1973 | Hackman et al. | |
| 4,541,608 A | | 9/1985 | Forester et al. | |
| 4,711,262 A | * | 12/1987 | Wafer et al. | ...................... 137/14 |
| 6,918,357 B2 | | 7/2005 | Norris | |
| 7,066,444 B2 | | 6/2006 | Zheng | |

FOREIGN PATENT DOCUMENTS

GB 641754 8/1950

OTHER PUBLICATIONS

PCT Search Report and Written Opinion for PCT/US2010/020823 mailed May 28, 2010.

* cited by examiner

*Primary Examiner* — Catherine Loikith
(74) *Attorney, Agent, or Firm* — Fletcher Yoder P.C.

(57) ABSTRACT

A non-rising stem gate valve is provided that includes a drive sleeve disposed between the gate and the stem. The drive sleeve is coupled to the stem and isolates the moveable connection between the sleeve and the stem from fluid in the valve. The drive sleeve is also coupled to the gate such that movement of the drive sleeve along the stem moves the gate between the open and closed positions of the valve.

27 Claims, 4 Drawing Sheets

DRIVE SLEEVE AND SEALING MECHANISM FOR NON-RISING STEM GATE VALVE

CROSS-REFERENCE TO RELATED APPLICATIONS

This application claims priority to and benefit of PCT Patent Application No. PCT/US2010/020823, entitled "Drive Sleeve and Sealing Mechanism for Non-Rising Stem Gate Valve," filed Jan. 12, 2010, which is herein incorporated by reference in its entirety, and which claims priority to and benefit of U.S. Provisional Patent Application No. 61/149,978, entitled "Drive Sleeve and Sealing Mechanism for Non-Rising Stem Gate Valve", filed on Feb. 4, 2009, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As will be appreciated, oil and natural gas have a profound effect on modern economies and societies. Indeed, devices and systems that depend on oil and natural gas are ubiquitous. For instance, oil and natural gas are used for fuel in a wide variety of vehicles, such as cars, airplanes, boats, and the like. Further, oil and natural gas are frequently used to heat homes during winter, to generate electricity, and to manufacture an astonishing array of everyday products.

In order to meet the demand for such natural resources, companies often invest significant amounts of time and money in searching for and extracting oil, natural gas, and other subterranean resources from the earth. Particularly, once a desired resource is discovered below the surface of the earth, drilling and production systems are often employed to access and extract the resource. These systems may be located onshore or offshore depending on the location of a desired resource. Once the natural resource is extracted, it is generally transported to processing locations, such as refineries. The transportation of these resources is accomplished through a system of pipelines, which are controlled through various types of valves located at different points throughout the system.

Such extraction systems may include pipelines or other transportation structures to transport the resource from a source, e.g., a well, to a destination such as further transportation systems or storage facilities. Such pipelines or other transportation structures may include pressure control, regulation, safety devices, which may include valves, actuators, sensors, and electronic circuitry. Such devices may be configured to relieve pressure or shut off flow of the resource if a high pressure condition is detected.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One type of valve referred in a mineral extraction system may be referred to as a gate valve. A gate valve includes a gate that may be moved between an open position to allow fluid flow through the valve, and a closed position to block fluid flowing through the valve. The gate valve may include a stem to enable movement of the gate, either through movement of the stem (rising stem gate valve) or movement of the gate along the stem (non-rising stem gate valve). The non-rising stem gate valve may offer some advantages over a rising stem gate valve, such as reduced dimensional profile and reduced input torque. However, in some systems using a non-rising stem gate valve, the non-rising stem may be exposed to fluid flowing through the valve. Such fluid may be corrosive and/or abrasive, and may include abrasive materials that result in increased wear of the gate valve. Such abrasion may eventually may interfere with operation of the gate valve and damage the non-rising stem, the gate, or the connection between the non-rising stem and the gate.

Embodiments of the present invention include a non-rising stem gate valve having a drive sleeve to isolate a moveable connection between the valve stem and the drive sleeve from fluid in the valve. The drive sleeve is coupled to both the valve gate and the valve stem, enabling movement of the drive sleeve along the stem to move the gate and open and close the valve. The connection between the valve gate and the drive sleeve may also be isolated from any fluid in the valve. The drive sleeve may include a sealing component to seal the upper end of the drive sleeve from pressure in the valve body. Additionally, the stem may be coated in a lubricant (e.g., a dry film lubricant) and another lubricant (e.g., grease) may be disposed in the cavity defined by the drive sleeve and the stem. The stem may include a chamber to allow the lubricant to flow into and out of the cavity during movement of the drive sleeve.

Figure 1:
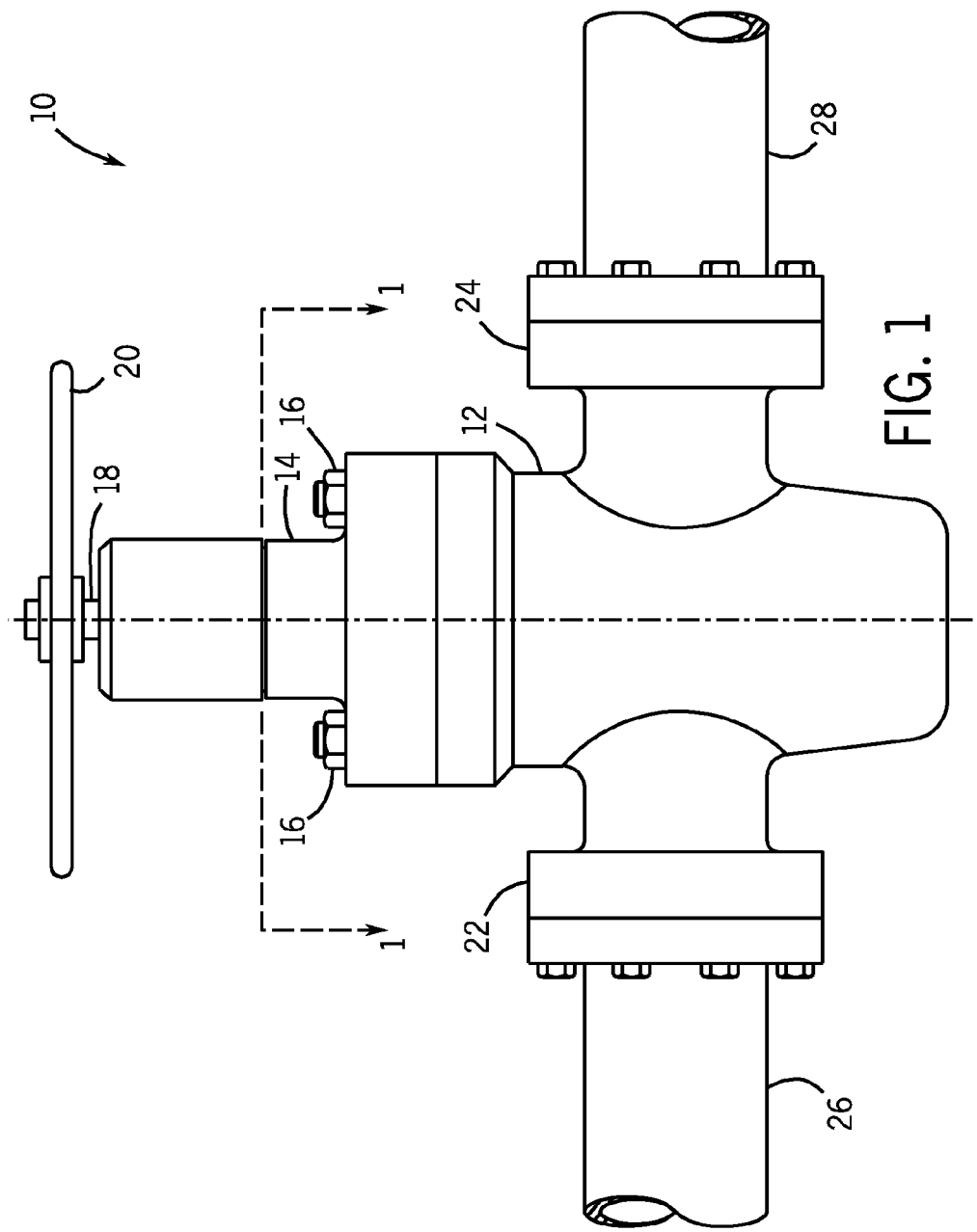
FIG. 1 is a front view of a non-rising stem gate valve in accordance with an embodiment of the present invention.

FIG. 1 is a front view of a non-rising stem gate valve 10 having a drive sleeve in accordance with an embodiment of the present invention. The non-rising stem gate valve 10 may include a valve body 12 coupled to a valve bonnet 14 via one or more bolts 16. The valve 10 may include a non-rising stem 18 (also referred to as a shaft) extending out of the upper portion of the bonnet 14. The stem 18 may be coupled to a handwheel 20 extending from the bonnet 14. As seen further below, the handwheel 20 enables rotation of the stem 18 to actuate the valve 10 between open and closed positions. The handwheel 20 may be operated by a human operator or may be automatically operated by a hydraulic or electric drive system. In other embodiments, the actuation mechanism of the valve 10 may include a hydraulic and/or electric actuator instead of the handwheel 20.

The valve 10 includes an inlet passage 22 (or inlet flange) and an outlet passage 24 (or outlet flange) to provide connection to piping or other components. For example, the valve 10 may be placed between an upstream pipe 26 transporting a fluid from a source and a downstream pipe 28 transporting the fluid to downstream equipment. In such an embodiment, the valve 10 may be used in an on/off manner to allow or block flow from the upstream pipe 26 through the valve 10 and into the downstream pipe 28. In other embodiments, the valve 10 may be used to regulate (e.g., choke) flow from the upstream pipe into the downstream pipe 28.

In some embodiments, the fluid flowing through the valve (also referred to as "valve lading") may be abrasive, e.g., the valve lading may include particulates or other materials that could abrade internal components of the valve 10. For example, such abrasive valve lading may include drilling muds, sand, silica, or any combination thereof. Other valve ladings may be corrosive or have other properties that could damage internal components of the valve 10.

Figure 2:
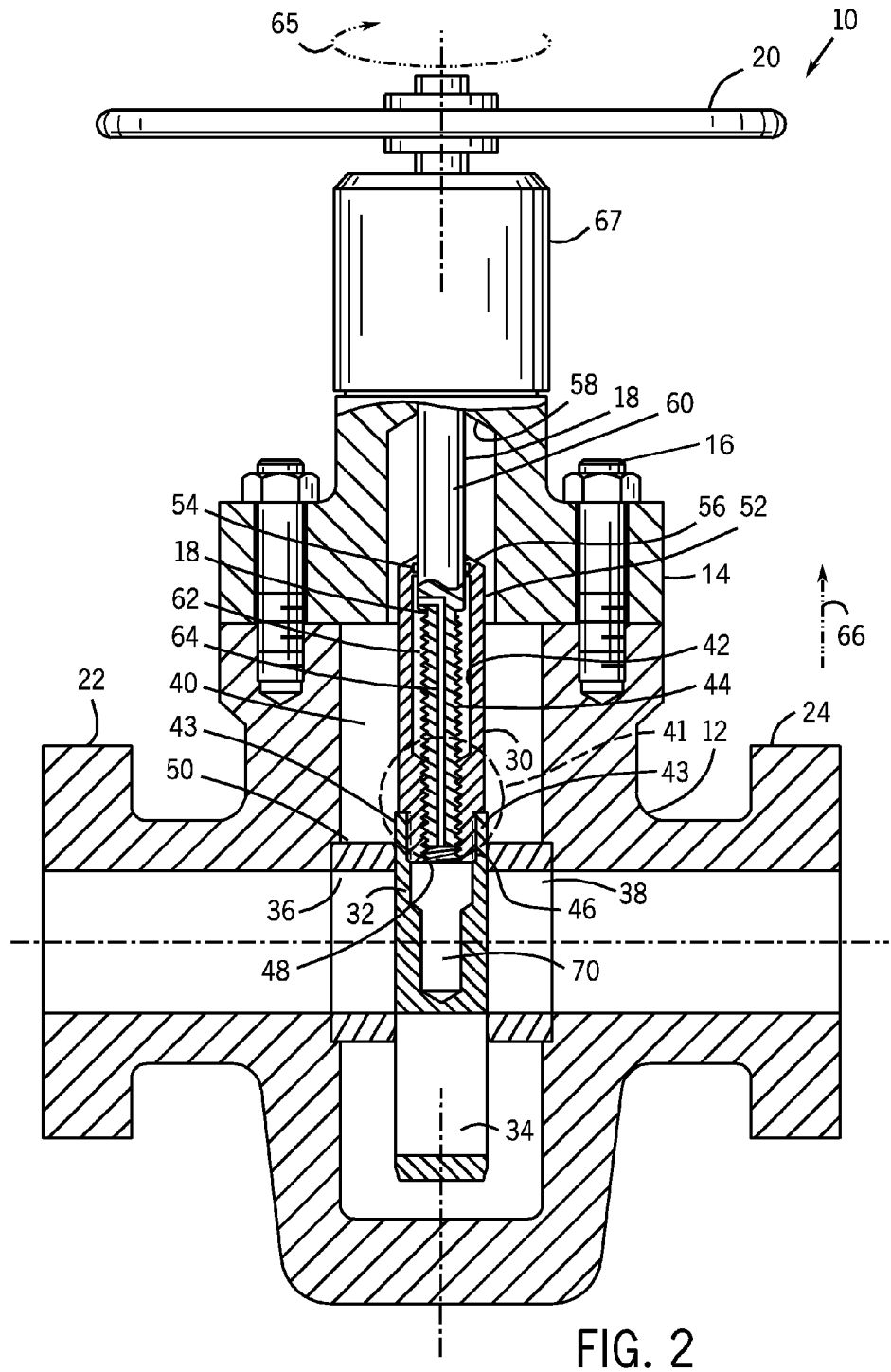
FIG. 2 is a cross-section of the non-rising stem gate valve of FIG. 1 in a closed position in accordance with an embodiment of the present invention.

FIG. 2 is a cross-section of the valve 10 taken along line 1-1 of FIG. 1 that depicts the valve 10 in a closed position in accordance with an embodiment of the present invention. As described further below, the valve 10 includes a drive sleeve 30 to protect internal components from the valve lading. The valve 10 includes the stem 18, the drive sleeve 30, and a slab gate 32. The drive sleeve 30 may be generally tubular and concentric with the stem 18. It should be appreciated that the term "slab gate" refers to the design of the gate 32, and other embodiments may include different types of gates that operate according to the mechanism described herein.

The gate 32 includes a port 34 that allows fluid flow through the valve body 12 when the gate 32 is in the open position. The valve body 12 also includes an inlet seat 36 and an outlet seat 38. Thus, by moving the gate 32 such that the port 34 is aligned with the inlet seat 36 and outlet seat 38, the valve 10 may be opened. Similarly, by moving the gate 32 such that the upper portion of the gate 32 is disposed between the inlet seat 36 and outlet seat 38, the valve 10 may be closed. It should be appreciated that the valve 10 may be bi-directional, and the terms "inlet" and "outlet" are used for ease of reference and do not describe any specific directional limitation of the valve 10. For example, the seats 36 and 38 may be either inlet or outlet seats respectively, and the passages 22 and 24 (or flanges) may also be either inlet or outlet passages (or flanges), respectively.

The valve body 12 includes the inlet passage 22 and outlet passage 24, and a chamber or body cavity 40 in fluid communication with the inlet passage 22 and outlet passage 24. As described, abrasive valve lading in the passages 22 and 24 and the chamber 40 may abrade internal components of the valve 10. For example, in a non-rising stem gate valve without aspects of the disclosed embodiments, gate travel may be provided through rotation of the stem 18 at a threaded connection between the gate and stem. This threaded connection may be exposed to the valve lading, and abrasive damage to the threaded connection may occur. In embodiments of the present invention, the drive sleeve 30 is interposed between the slab gate 32 and the stem 18, isolating the gate connection and the thread connection from the valve lading.

Turning now in more detail to the drive sleeve 30 and gate 32, the drive sleeve 30 is coupled to the stem 18 at a drive sleeve/stem interface 41 and the gate 32 is coupled to the drive sleeve 30 at a gate/drive sleeve interface 43. The drive sleeve 30 includes internal threads 42 to couple to the stem 18. The stem 18 may include threads 44 to allow travel (e.g., translation) of the drive sleeve 30 up and down the stem 18 as the stem 18 rotates. In some embodiments, the threads 42 and 44 may be power threads, such as acme threads, square threads, or any suitable threads. In some embodiments, the drive sleeve 30 may consist essentially of stainless steel or any suitable material.

The drive sleeve 30 may include external threads 46 to couple to the gate 32. The gate 32 may include internal threads 48 to couple to the external threads 46 of the drive sleeve 30. The drive sleeve/gate interface 43 may also include a locking fastener 50, such as a pin, screw, or other suitable fastener. The locking fastener 50 locks the drive sleeve 30 to the gate 32. In other embodiments, the drive sleeve 30 may be machined directly into the gate 32. In other words, sleeve 30 and gate 32 may be a one-piece structure (i.e., without the threads 46 and 48) as indicated by an outer perimeter of both the sleeve 30 and the gate 32 as shown in FIG. 2. It should be appreciated that when operating the valve 10, the drive sleeve/gate interface 43 may be designed to resist gate drag on the gate 32.

The upper end 52 of the drive sleeve 30 may include a sealing component 54, such as an o-ring or other suitable seal. The sealing component 54 isolates the interior of the drive sleeve 30 from the pressure in the valve body 12, such as from valve lading in the valve chamber. The upper end of the drive sleeve 30 also includes external beveled edge 56 (also referred to as an up-stop). As shown below in FIG. 3, the beveled edge 56 of the drive sleeve 30 may abut the top 58 of the valve chamber to limit travel of the gate 32 when the gate 32 is moved upward to an open position. An upper portion 60 of the stem 18 may also be coated in a dry film lubricant or other suitable protective lubricant to prevent scale, particulates, or other materials from damaging the sealing component 54 of the drive sleeve 30.

Grease or other lubricant may be disposed in an interior cavity 62 defined by the drive sleeve 30 and the stem 18. To allow movement of the grease during movement of the drive sleeve 30, the stem 18 may include a passage or chamber 64 that extends from the top of the stem 18 through the stem 18 toward the gate 32. As illustrated, the chamber 64 extends to the interior cavity 62 (e.g., L-shaped passage). During operation of the valve 10 and movement of the drive sleeve 30, the grease may flow from the interior space 62 and into the chamber 64 of the stem 18 or vice-versa.

To open the valve 10, the handwheel 20 may be rotated in the direction generally indicated by arrow 65. Rotation of the handwheel 20 causes the stem 18 to rotate. As the stem 18 rotates, the threaded drive sleeve/stem interface 41 enables the drive sleeve 30 to move (e.g., translate) along the stem 18 in the direction generally indicated by arrow 66. The drive sleeve/gate interface 43 thus causes the gate 32 to also move (e.g., translate) in the direction indicated by arrow 66 until the port 34 of the gate 32 is aligned with the inlet and outlet passages 22 and 24.

It should be appreciated that opening or closing the valve 10 may result in overcoming the gate drag applied to the gate 32 by the valve lading and the stem thrust applied to the stem 18 by the valve lading. Accordingly, the valve 10 may include thrust bearings (not shown) disposed outside the body cavity 40, such as in an upper portion 67 of the bonnet 14, to absorb the stem thrust pressure. Further, when opening or closing the valve 10, additional torque may be applied as a result of pressure from the body cavity 40 applied to the sealing component. This additional torque may be offset by the lubricant disposed in the cavity 40.

Figure 3:
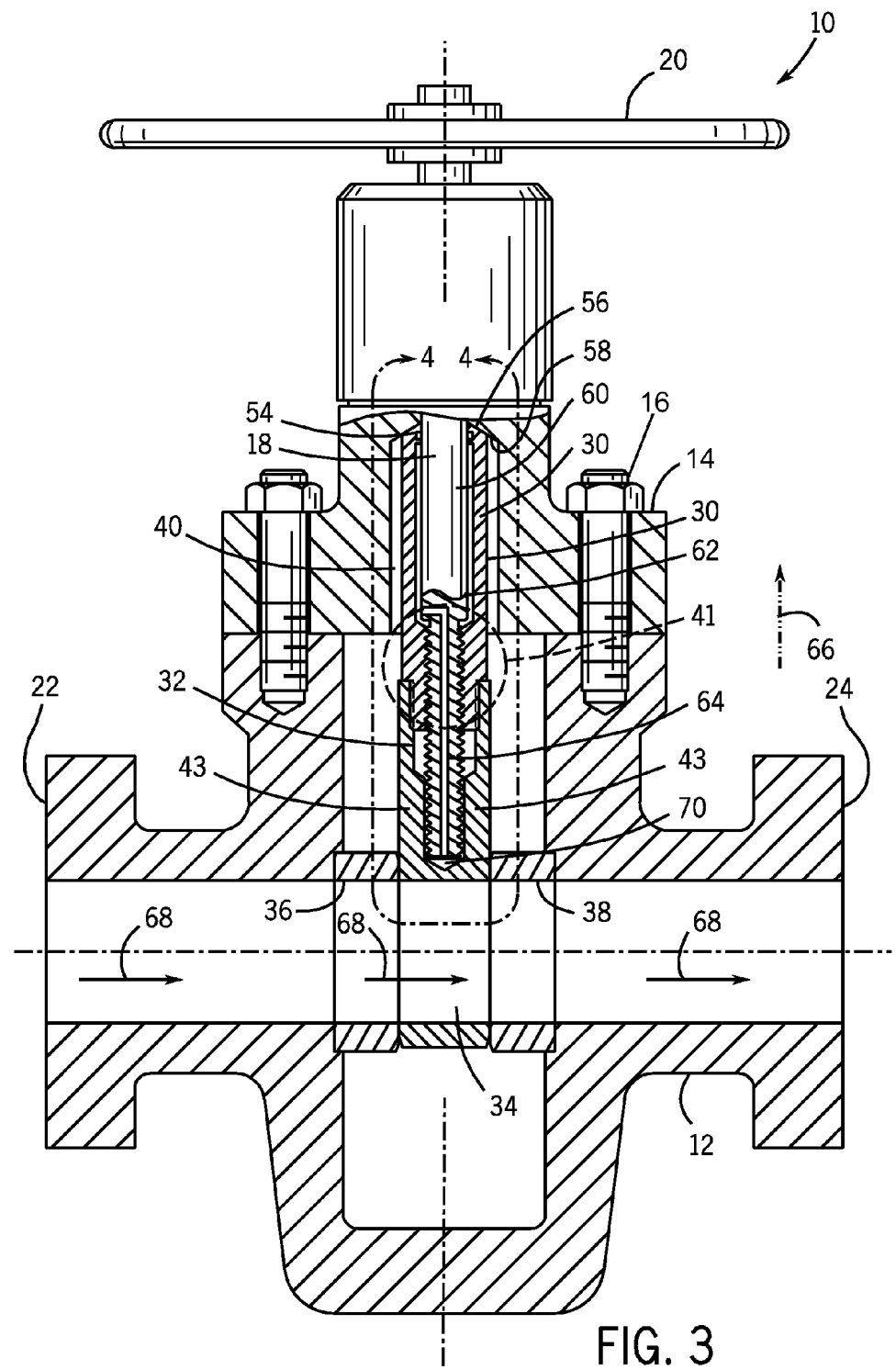
FIG. 3 is a cross-section of the non-rising stem gate valve of FIG. 1 in an open position in accordance with an embodiment of the present invention.

FIG. 3 is a cross-section of the valve 10 in an open position in accordance with an embodiment of the present invention. As shown in FIG. 3, the port 34 is aligned with the inlet and outlet passages 22 and 24 to allow valve lading to flow through the valve 10. The direction of flow is generally indicated by arrows 68. As the gate 32 moves in the direction generally indicated by arrow 66, the stem 18 moves into a recess 70 of the gate 32. The gate 32 and drive sleeve 30 may be moved along the stem 18 until the beveled edge 56 abuts the upper portion 60 of the valve chamber 40. As the drive sleeve 30 moves in the direction generally indicated by arrow 66 and the interior space 62 decreases in size, grease disposed in the interior space 62 may flow into the chamber 64 of the stem 18.

As seen in FIGS. 2 and 3, the interface 41 between the drive sleeve 30 and the stem 18 is isolated from any valve lading in the inlet and outlet passages 22 and 24 and the valve chamber 40. By isolating this interface 41, the threads 42 and 44 of the interface 41 are not exposed to abrading (or corrosion) by the valve lading, thus ensuring the integrity of the threaded interface 41. Further, the gate 32 is not directly attached to the stem 18, eliminating any movement of the threads 48 of the gate 32 during opening and closing of valve 10 and movement of the gate 32, thus protecting this drive sleeve/gate interface 43.

Figure 4:
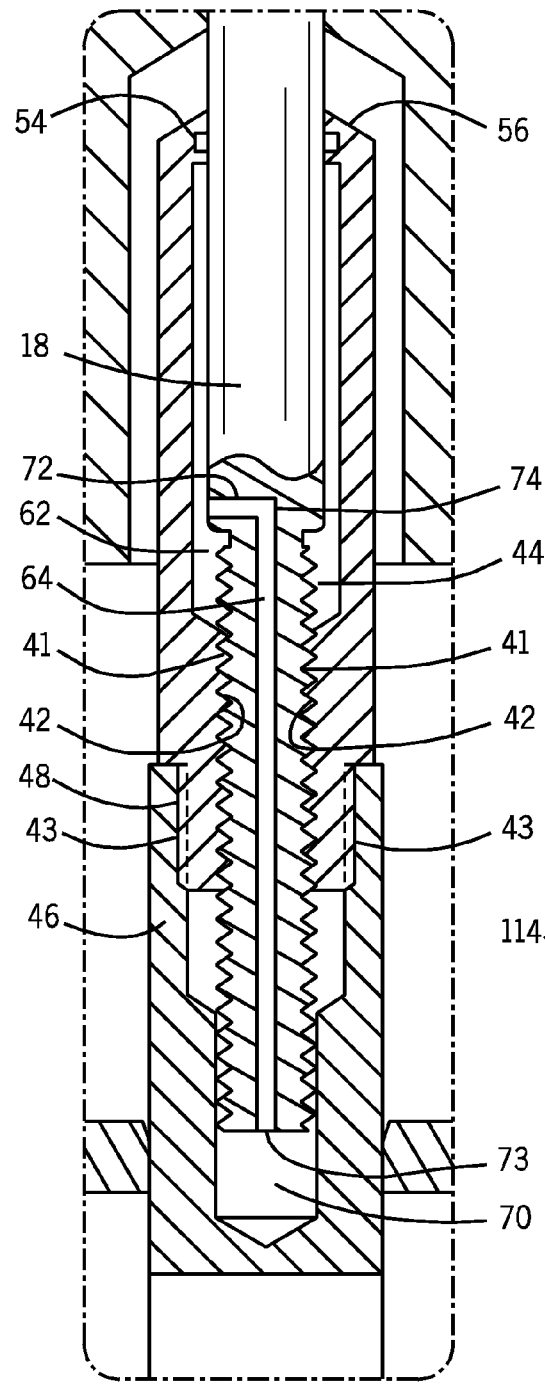
FIG. 4 is a close-up of a drive sleeve of the non-rising stem gate valve of FIG. 1 in accordance with an embodiment of the present invention.

FIG. 4 is a close-up cross-sectional view of the drive sleeve 30, gate 32 and stem 18 of the valve 10 in accordance with an embodiment of the present invention. As more clearly seen in the FIG. 4, the chamber 64 has a lateral opening 72 open to the internal cavity 62 and extends from the internal cavity 62 into the stem 18. In some embodiments, the chamber 64 may by enclosed by the stem 18. In other embodiments, the chamber 64 may extend through the stem 18 and include a second opening 73, such that the chamber 64 connects with the recess 70 of the gate 32 so that grease or other lubricant may flow between the internal cavity 62 and recess 70 during movement of the drive sleeve 30 and gate 32.

In one embodiment, the chamber 64 may be generally "L-shaped" such that the chamber 64 includes a 90 degree bend at a middle portion 74 of the stem 18. Thus, the opening 72 of the chamber 64 is open to the internal cavity 62 such that the opening 72 remains within the sealing component 54, blocking valve lading from entering the chamber 64.

The drive sleeve 30 allows use of the non-rising stem gate valve 10 in applications that would otherwise be precluded due to the presence of abrasive valve lading. For example, the non-rising stem gate valve 10 having the drive sleeve 30 may be used with abrasive drilling fluids and provide the typical advantages of a non-rising stem gate valve, such as reduced input torque and smaller dimensional profile. As described above, the drive sleeve 30 substantially or completely eliminates any exposure of the threaded stem interface 41 from the abrasive drilling fluids and isolates the moveable connection of the stem 18 from such fluids.

Further, it should be appreciated that the drive sleeve 30 may be used with any type of gate valve to protect a stem from valve lading. For example, the drive sleeve 30 may be used in a rising stem gate valve such that the drive sleeve moves with the rising stem during actuation of the valve.

Figure 5:
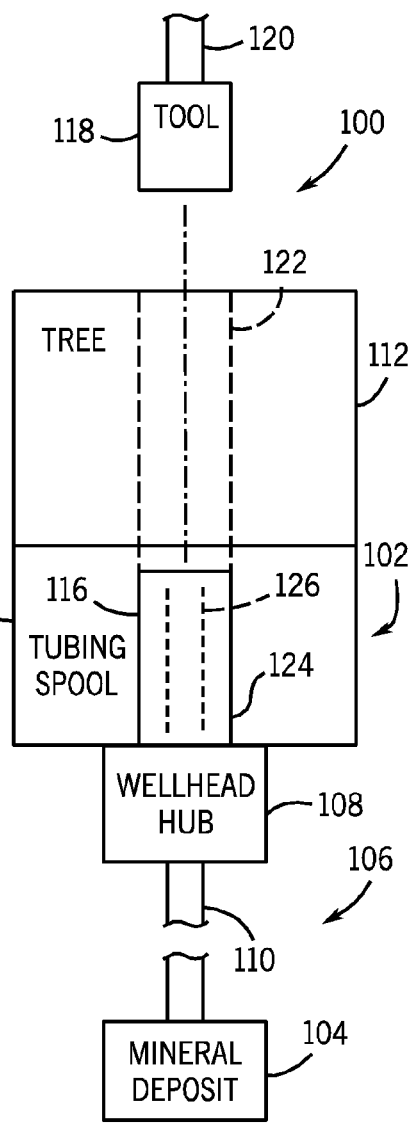
FIG. 5 is a mineral extraction system using a non-rising stem gate valve in accordance with an embodiment of the present invention.

FIG. 5 is a block diagram that illustrates a mineral extraction system 100 that may include the non-rising stem gate valve 10 in accordance with embodiments of the present technique. The illustrated mineral extraction system 100 can be configured to extract various minerals and natural resources, including hydrocarbons (e.g., oil and/or natural gas), or configured to inject substances into the earth. In some embodiments, the mineral extraction system 100 is land-based (e.g., a surface system) or subsea (e.g., a subsea system). In the illustrated embodiment, the system 100 includes a wellhead 102 coupled to a mineral deposit 104 via a well 106, wherein the well 106 includes a wellhead hub 108 and a well-bore 110.

The wellhead hub 108 generally includes a large diameter hub that is disposed at the termination of the well bore 110. The wellhead hub 108 provides for the connection of the wellhead 102 to the well 106. In some embodiments, the wellhead 102 includes a connector that is coupled to a complementary connector of the wellhead hub 108. For example, in one embodiment, the wellhead hub 108 includes a DWHC (Deep Water High Capacity) hub manufactured by Cameron, headquartered in Houston, Tex., and the wellhead 102 includes a complementary collet connector (e.g., a DWHC connector), also manufactured by Cameron.

The wellhead 102 typically includes multiple components that control and regulate activities and conditions associated with the well 106. In some embodiments, the wellhead 102 generally includes bodies, valves and seals that route produced minerals from the mineral deposit 104, provides for regulating pressure in the well 106, and provides for the injection of chemicals into the well bore 110 (down-hole). For example, in the illustrated embodiment, the wellhead 102 includes what is colloquially referred to as a christmas tree 112 (hereinafter, a tree), a tubing spool 114, and a hanger 116 (e.g., a tubing hanger or a casing hanger).

The system 100 may include other devices that are coupled to the wellhead 102, and devices that are used to assemble and control various components of the wellhead 102. For example, in the illustrated embodiment, the system 100 includes a tool 118 suspended from a drill string 120. In certain embodiments, the tool 118 includes a running tool that is lowered (e.g., run) from an offshore vessel to the well 106 and/or the wellhead 102. In other embodiments, such as surface systems, the tool 118 may include a device suspended over and/or lowered into the wellhead 102 via a crane or other supporting device.

The tree 112 generally includes a variety of flow paths (e.g., bores), valves, fittings, and controls for operating the well 106. For instance, in some embodiments, the tree 112 includes a frame that is disposed about a tree body, a flow-loop, actuators, and valves. Further, the tree 112 generally provides fluid communication with the well 106. For example, in the illustrated embodiment, the tree 112 includes a tree bore 122. The tree bore 122 provides for completion and workover procedures, such as the insertion of tools (e.g., the hanger 116) into the well 106, the injection of various chemicals into the well 106 (down-hole), and the like. Further, minerals extracted from the well 106 (e.g., oil and natural gas) are generally regulated and routed via the tree 112. For instance, the tree 112 may be coupled to a jumper or a flowline that is tied back to other components, such as a manifold. Accordingly, in such an embodiment, produced minerals flow from the well 106 to the manifold via the wellhead 102 and/or the tree 112 before being routed to shipping or storage facilities.

The tubing spool 114 provides a base for the wellhead 24 and/or an intermediate connection between the wellhead hub 108 and the tree 112. Typically, the tubing spool 114 (also referred to as a tubing head) is one of many components in a modular subsea or surface mineral extraction system 100 that are run from an offshore vessel and/or a surface installation system. As illustrated, the tubing spool 114 includes a tubing spool bore 124. The tubing spool bore 124 connects (e.g., enables fluid communication between) the tree bore 122 and the well 106. Thus, the tubing spool bore 124 provides access to the well bore 110 for various completion procedures, worker procedures, and the like. For example, components can be run down to the wellhead 102 and disposed in the tubing spool bore 124 to seal-off the well bore 110, to inject chemicals down-hole, to suspend tools down-hole, and/or to retrieve tools from down-hole.

The illustrated hanger 116 (e.g., tubing hanger or casing hanger), for example, is typically disposed within the wellhead 106 to secure tubing and casing suspended in the well bore 110, and to provide a path for hydraulic control fluid, chemical injections, and the like. The hanger 116 includes a hanger bore 126 that extends through the center of the hanger 116, and that is in fluid communication with the tubing spool bore 124 and the well bore 110. The mineral extraction system 100 may include plugs and valves are employed to regulate the flow and pressures of fluids in various bores and channels throughout the mineral extraction system 100. In some embodiments, these valves may include the non-rising stem gate valve 10 having the drive sleeve 30. For example, the valve 10 may be included in the tree 112. The valve 10 may also regulate flow to and/or from the wellhead hub 108 and the mineral deposit 104

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
   a gate valve, comprising:
   a gate disposed in a valve body;
   a stem coupled to the gate; and
   a drive sleeve interposed between the gate and the stem;
   wherein the drive sleeve comprises a sealing component to isolate an interface between the drive sleeve and the stem from fluid in the gate valve;
   wherein the interface comprises a threaded interface completely isolated by the drive sleeve and the sealing component disposed between the drive sleeve and the stem;
   wherein the drive sleeve is movable in an axial direction relative to the valve body, or the drive sleeve is coupled to and moves with the gate, or the drive sleeve comprises a chamber coupled to a cavity in the stem, or a combination thereof.

2. The system of claim 1, wherein the stem comprises external threads and the drive sleeve comprises internal threads coupled to the external threads, wherein the drive sleeve extends concentrically about and protects the external threads.

3. The system of claim 2, wherein the interface comprises the external threads and the internal threads.

4. The system of claim 2, wherein the drive sleeve is configured to move in the axial direction along the length of the stem via the internal threads and external threads such that the gate moves from a first position to a second position.

5. The system of claim 1, wherein the drive sleeve comprises the chamber coupled to the cavity in the stem, wherein the cavity comprises a passage extending internally through the stem from an inlet in the stem to an outlet in the stem.

6. The system of claim 1, comprising a locking fastener configured to lock the gate to the drive sleeve.

7. The system of claim 1, wherein the drive sleeve and the gate are integrally formed as a single component.

8. The system of claim 1, wherein the sealing component is disposed along a non-threaded portion of the stem, and the sealing component seals the chamber of the drive sleeve around a threaded portion of the interface between the drive sleeve and the stem.

9. The system of claim 1, comprising a lubricant disposed in the cavity in the stem, in the chamber between the drive sleeve and the stem, or a combination thereof.

10. The system of claim 9, wherein the cavity extends through the stem from the chamber to a recess in the gate, wherein the lubricant is disposed in the cavity, the chamber, and the recess.

11. The system of claim 1, wherein the drive sleeve is movable in the axial direction relative to the valve body.

12. The system of claim 1, wherein the drive sleeve is coupled to and moves with the gate.

13. The system of claim 1, wherein the drive sleeve comprises the chamber coupled to the cavity in the stem, wherein cavity extends through the stem from the chamber to a recess in the gate.

14. The system of claim 1, wherein the stem rotates to cause movement of the drive sleeve in the axial direction without rotation of the drive sleeve, and the stem rotates without moving in the axial direction.

15. A mineral extraction system, comprising:
   a wellhead assembly, comprising:
   a wellhead component; and
   a non-rising stem gate valve coupled to the wellhead component, wherein the non-rising stem gate valve comprises:
   a gate disposed in a valve body;
   a stem coupled to the gate;
   a drive sleeve interposed between the gate and the stem; and
   a sealing component disposed between the drive sleeve and the stem, wherein the sealing component is configured to isolate a threaded interface between the drive sleeve and the stem from fluid in the non-rising stem gate valve.

16. The mineral extraction system of claim 15, wherein the sealing component is disposed along a non-threaded portion of the stem, and the sealing component seals a chamber of the drive sleeve around the threaded interface between the drive sleeve and the stem.

17. The mineral extraction system of claim 15, wherein the stem rotates to cause translation of the drive sleeve and the gate.

18. A valve comprising:
   a body;
   a shaft;
   a movable valve portion disposed within the body and coupled to the shaft, wherein the movable valve portion is configured to allow fluid flow through the valve when in a first position and to block fluid flow through the valve when in a second position; and
   an isolating component disposed between the moveable valve portion and the shaft, wherein the isolating component is configured to isolate a threaded connection between the shaft and the isolating component along an entire path of travel of the movable valve portion between the first and second positions.

19. The valve of claim 18, wherein the isolating component is coupled to the moveable portion.

20. The valve of claim 18, wherein the isolating component comprises a tubular component disposed concentrically around the shaft along a length of the shaft, and the isolating component comprises a sealing component disposed between the tubular component and the shaft to seal the threaded connection from exposure to the fluid flow through the valve.

21. The valve of claim 18, wherein the shaft rotates to cause translation of the moveable portion.

22. The valve of claim 18, comprising an annular chamber spaced between the shaft and the isolating component.

23. The valve of claim 22, comprising a passage extending internally through the shaft between first and second ports, wherein the passage connects to the annular chamber and a recess in the movable valve portion.

24. A system, comprising:
a valve assembly, comprising:
 a valve body;
 a fluid passage through the valve body between a fluid inlet and a fluid outlet;
 a stem extending into the valve body;
 a valve disposed in the valve body; and
 a sleeve coupling the stem to the valve, wherein the sleeve is coupled to the stem via a threaded interface, the sleeve surrounds the threaded interface, a seal is disposed between the sleeve and the stem to isolate a chamber surrounding the threaded interface, and the valve is configured to open and close the fluid passage in response to movement of the stem.

25. The system of claim 24, wherein the valve comprises a recess, the stem is configured to move in and out of the recess while moving the valve between the first and second positions, and the threaded interface is completely contained within the sleeve and the valve while the stem moves the valve between the first and second positions.

26. A system, comprising:
a gate valve, comprising:
 a gate disposed in a valve body;
 a stem coupled to the gate; and
 a drive sleeve interposed between the gate and the stem, wherein the drive sleeve comprises a sealing component to isolate an interface between the drive sleeve and the stem from fluid in the gate valve, and the sealing component is disposed along a non-threaded portion of the stem;
wherein the drive sleeve is movable in an axial direction relative to the valve body, or the drive sleeve is coupled to and moves with the gate, or the drive sleeve comprises a chamber coupled to a cavity in the stem, or a combination thereof;
wherein the sealing component seals the chamber of the drive sleeve around a threaded portion of the interface between the drive sleeve and the stem.

27. A system, comprising:
a gate valve, comprising:
 a gate disposed in a valve body;
 a stem coupled to the gate; and
 a drive sleeve interposed between the gate and the stem, wherein the drive sleeve comprises a sealing component to isolate an interface between the drive sleeve and the stem from fluid in the gate valve, the drive sleeve comprises a chamber coupled to a cavity in the stem, and the cavity extends through the stem from the chamber to a recess in the gate.

* * * * *